April 14, 1959
G. TRIULZI
2,881,477
EQUIPMENT FOR THE PRE-PLASTIFICATION AND
THE INJECTION OF THERMOPLASTIC MATERIALS
Filed Jan. 24, 1956
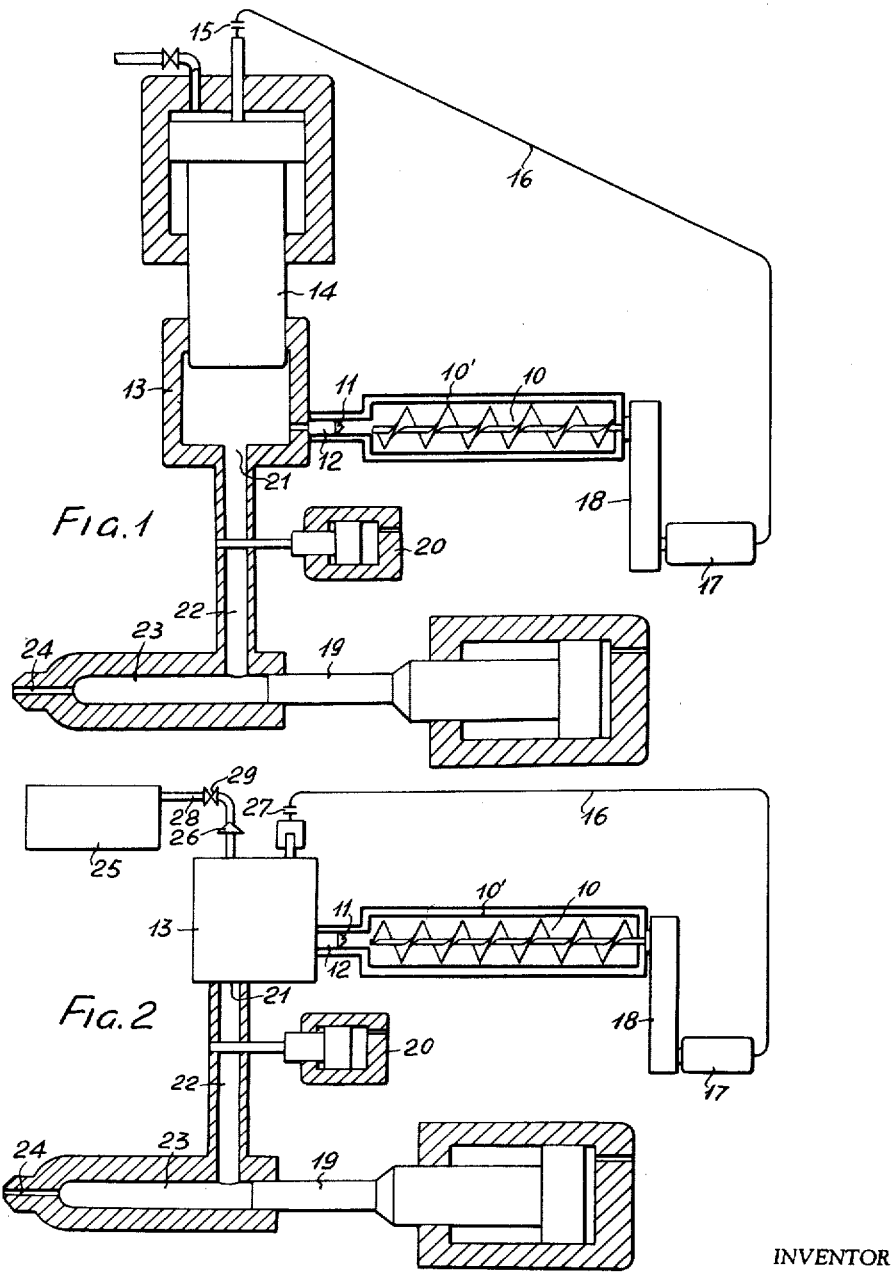
INVENTOR
GIUSEPPE TRIULZI
BY Young, Emery & Thompson
ATTORNEYS

United States Patent Office 2,881,477
Patented Apr. 14, 1959

2,881,477

EQUIPMENT FOR THE PRE-PLASTIFICATION AND THE INJECTION OF THERMOPLASTIC MATERIALS

Giuseppe Triulzi, Milan, Italy

Application January 24, 1956, Serial No. 561,088

Claims priority, application Italy January 27, 1955

3 Claims. (Cl. 18—30)

It is known how, theretofore, the pre-classification takes takes place directly in the injection chamber, or in a screw-type extruding machine, from which then the compound passes into the injection cylinder, from where the pre-plastified material is forced out by the injection piston.

It is difficult however to combine the continuous operation of the screw-type extruding machine with the batch discontinuous cycle of the press, whereby the extruding machine has to be stopped. There arises thus the problem of avoiding the over-heating of large batches of material contained in the screw operated extruder during the duration of its stopping, and it is moreover difficult to start again the rotary movement of the extruder, with its screw full of material, except for a few types of material which are not harmed by the overheating. The direct combination screw-type extruder press brings about therefore some limitations in the use of materials.

It is the object of the present invention to obviate all of the above mentioned inconveniences by providing an arrangement for the pre-classification and the injection of thermoplastic materials, substantially constituted by a screw-type extruder functioning as a heating chamber for the material; by an injection press; by a buffer reservoir provided with means for expelling and discharging the accumulated material, said buffer reservoir being connected both with the extruder and with the press.

The annexed drawing shows diagrammatically, in the way of a non-limiting example, two forms of practical embodiment of the present invention; more precisely.

Fig. 1 illustrates diagrammatically the arrangement object of the present invention, with the buffer reservoir provided with a piston.

Fig. 2 represents diagrammatically the arrangement object of the present invention, wherein the pressure for expelling the accumulated material out of the reservoir is exercised by a gas.

The arrangement according to Fig. 1 comprises: the screw-type extruder 10 contained within a shell 10', wherein the material is heated and made to advance; the one-way valve 11, provided in the duct 12, communicating with the buffer reservoir 13, wherein glides the piston 14, exercising an adjustable pressure, and connected with an electric safety device 15, inserted in the circuit 16 feeding the motor 17. The reservoir 13 is provided with an opening 21, leading into the conduit 22, on which there is mounted a valve 20. The conduit 22 leads to the injection chamber 23, wherein glides the piston 19. The motor 17 is connected to the screw-type extruder 10 through a speed reducing transmission 18.

The arrangement of Fig. 2 is different from that shown in Fig. 1 only inasmuch as the pressure in the reservoir, instead of being exercised by means of a piston, is brought about by a gas contained in the reservoir 25, connected through the pipe 28 with the buffer reservoir 13, and provided with a valve 29 for controlling the pressure.

According to Fig. 1, the material is heated and made to advance in the extruder 10, leading to the conduit 12 for feeding the pre-plastified material to the buffer reservoir 13, the feed-back of the material through the conduit 12 being prevented by the one-way valve 11.

The material entering the reservoir 13 lifts the piston 14 up to a maximum level, beyond which the electric safety device would intervene to cut off the circuit 16 thus stopping the motor 17, which is connected through the speed reducing transmission 18 to the screw of the heating extruder 10. When in response to the stroke of the press cylinder 19, the feed valve 20 is opened, the material is forced by the piston 14, and through the conduit 22, into the injection chamber 23, wherefrom it is injected through the nozzle 24 by means of the piston 19.

The operation of the arrangement according to Fig. 2 is similar; the pre-plastified material, by means of the screw 10, is made to advance in the conduit 12 from where, through the one-way valve 11, it enters the buffer reservoir 13.

When, with the piston 19 in a certain predetermined position, the valve 20 is opened, the gas contained in the reservoir 25 expells the pre-plastified material contained in the reservoir 13 towards the chamber 23 through the opening 21 and the conduit 22, the opening or closing of which is effected by actuation of the valve 20.

The gas contained in the reservoir 25 is generally such as not to bring about any alteration of the pre-plastified thermoplastic material collected in 13. Should the material fed to the reservoir 13 be such as to exert on the pressure-sensitive elements of pressure controlling device a pressure exceeding a predetermined magnitude, said pressure control apparatus, to which is connected the breaker 27, disconnecting the circuit 16, would operate, thus stopping the motor 17 and therefore also the extruder 10.

The safety devices operate exceptionally well because the output of material from the extruder is controlled through the speed changing transmission 18 in accordance with the consumption of the press.

The features and engineering details of the device object of the present invention may vary according to needs, but all will be included in the field of the present invention.

What I claim is:

1. Equipment for the pre-plastification and injection of thermo-plastic materials comprising extruder means, a reservoir, conduit means connecting said extruder means to said reservoir and comprising valve means permitting flow only to said reservoir from said extruder means, injection molding means, second conduit means connecting said reservoir to said injection molding means, valve means in said second conduit means, and means to vary the effective volume of said reservoir.

2. Equipment for the pre-plastification and injection of thermoplastic materials, comprising a screw-type extruder for heating and feeding the material, an injection press, a buffer reservoir provided with means for expelling and discharging the accumulated material, and means for connecting said reservoir both to the press intermittently and to the screw-type extruder continuously, the means for expelling and discharging the material accumulated in the buffer reservoir including a gas reservoir containing a gas under pressure connected with said buffer reservoir, and a valve for controlling the flow of gas from the gas reservoir to the buffer reservoir.

3. Equipment for the pre-plastification and injection of thermoplastic materials according to claim 2, in which a pressure control apparatus is connected with the buffer reservoir for actuating an electric safety device inserted between the buffer reservoir and the motor driving the extruder to prevent any overloading of the buffer reservoir.

References Cited in the file of this patent

UNITED STATES PATENTS

| 2,359,840 | Goessling | Oct. 10, 1944 |
| 2,478,013 | Roddy | Aug. 2, 1949 |
| 2,704,380 | Cuzzi | Mar. 22, 1955 |
| 2,754,545 | Hendry | July 17, 1956 |